Oct. 27, 1931.  H. W. ZIMMERMAN  1,828,758
SPRING JACK
Filed July 20, 1929  2 Sheets-Sheet 1
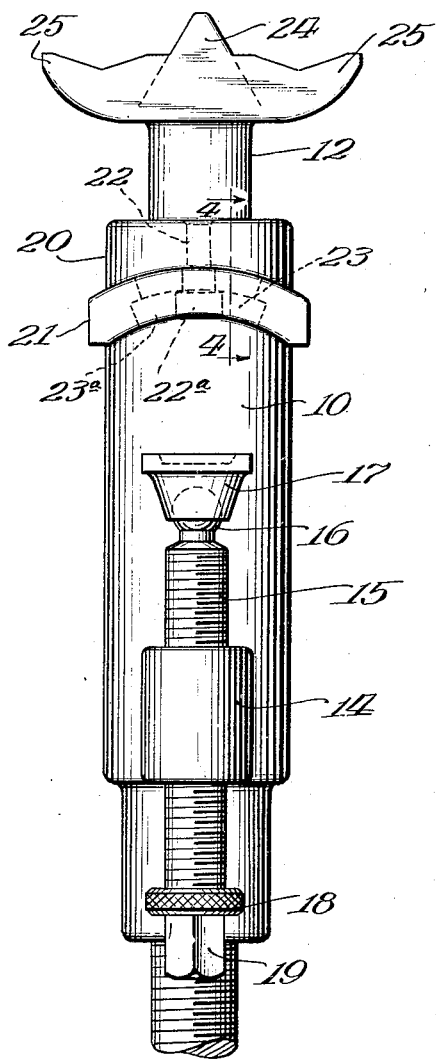
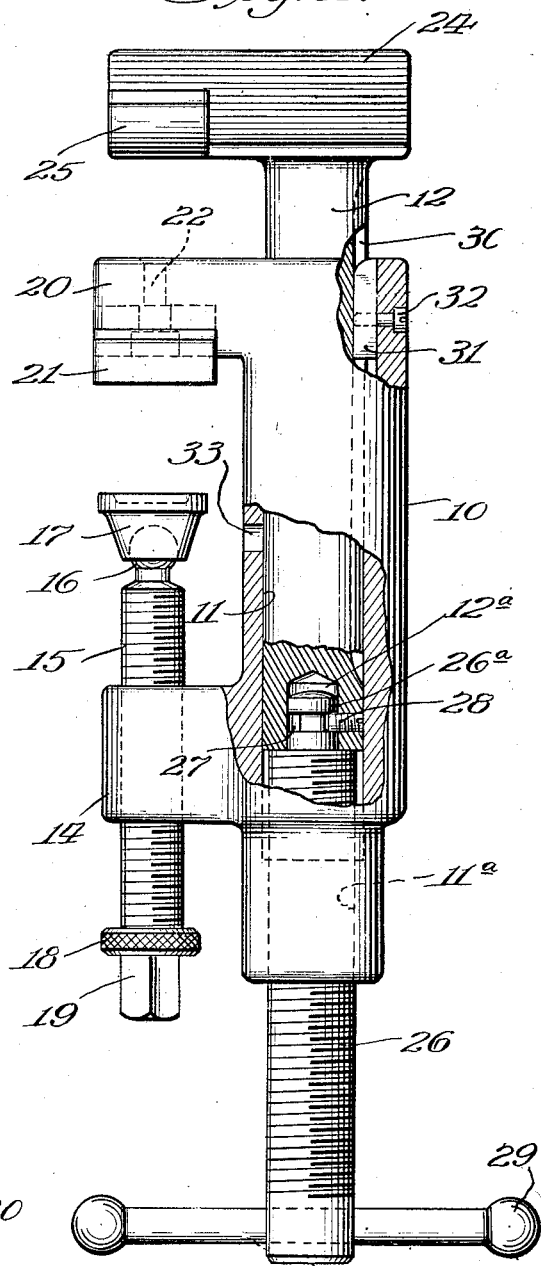
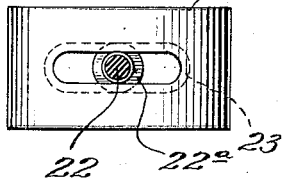
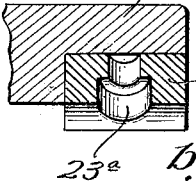
Inventor
Herman W. Zimmerman,
by Rector, Hibben, Davis & Macauley
Attys Oct. 27, 1931.    H. W. ZIMMERMAN    1,828,758
SPRING JACK
Filed July 20, 1929    2 Sheets-Sheet 2
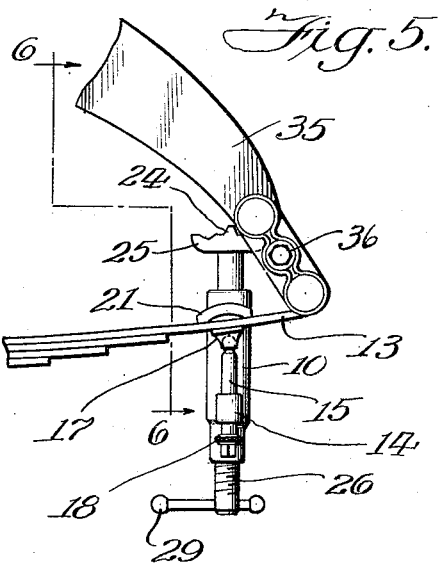
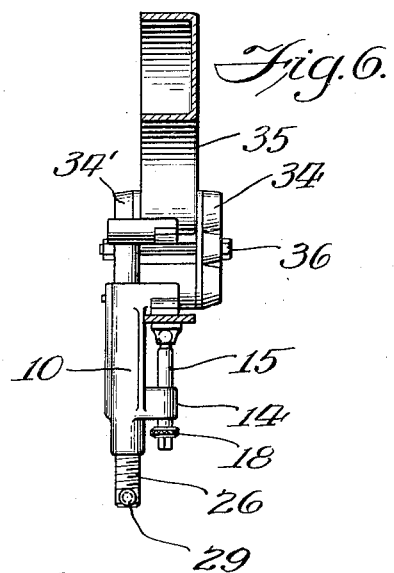
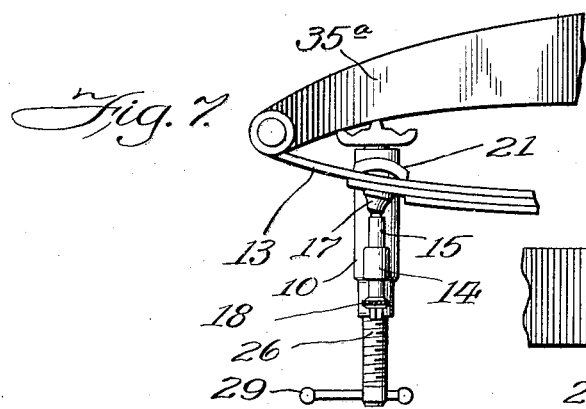
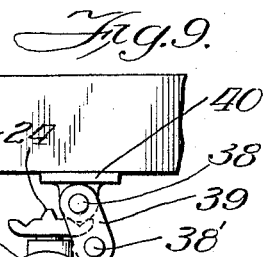
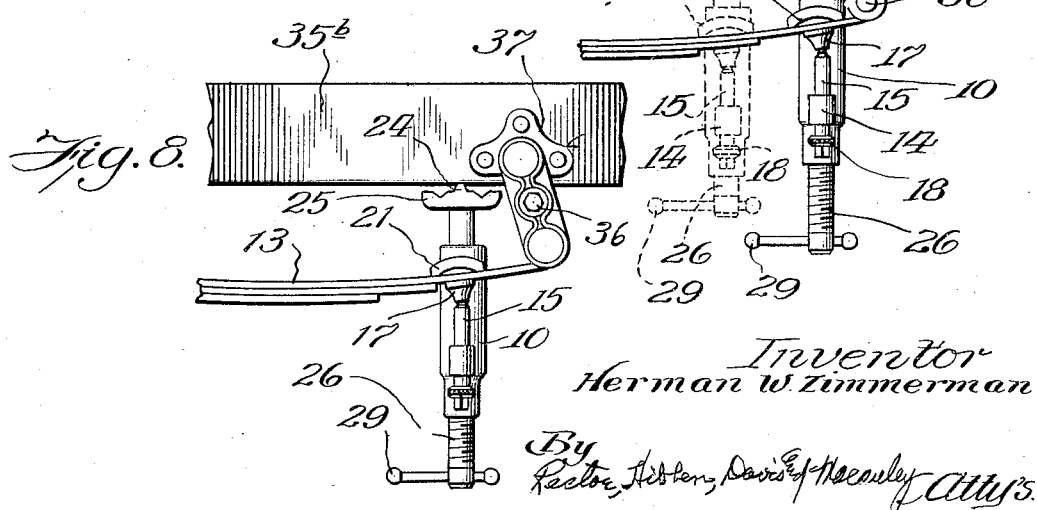
Inventor
Herman W. Zimmerman
By Rector, Hibben, Davis & Macauley Attys.

Patented Oct. 27, 1931

1,828,758

UNITED STATES PATENT OFFICE

HERMAN W. ZIMMERMAN, OF CHICAGO, ILLINOIS, ASSIGNOR TO AUTOMOTIVE MAINTENANCE MACHINERY CO., OF CHICAGO, ILLINOIS, A CORPORATION OF ILLINOIS

SPRING JACK

Application filed July 20, 1929. Serial No. 379,646.

My invention relates to jack structure and has to do particularly with structure of a character adapted for adjustment to the shackled members, such as the frame and spring of a vehicle for supporting and positioning the same for proper lubrication, inspection, repair and replacement of the shackles.

Shackles employed in the suspension of motor vehicle springs tend to wear quite rapidly. This requires frequent lubrication, inspection, repair and replacement for most efficient operation of the vehicle. The distribution of the load upon the shackles is such that if the load is not relieved and the shackle parts freed, when a lubricant is applied thereto, such lubricant will not be evenly distributed throughout the shackle parts and at the points where wear tends to take place more rapidly. Further, this wear condition makes it necessary at times to repair the shackles and to replace worn out parts. This may best be accomplished by supporting the shackled parts, such as the spring and the frame of the vehicle, in certain predetermined relation wherein the shackle parts are free and capable of being easily and quickly worked upon, removed, replaced, etc. In case the shackle members are removed for a time, it is also very desirable that the frame and spring be supported in predetermined positions during that time and with a minimum of danger of the same being accidentally displaced.

One of the objects of my invention is to provide a spring jack structure for the accomplishment of the foregoing desirable features. More particularly, my invention provides a jack structure which may be readily and positively applied to the spring and frame of the vehicle so as to adjust the shackle to a position wherein the parts thereof are free and the lubricant, when applied thereto, will be evenly distributed upon the wear points; and the jack structure also provides for thorough inspection and for repair of the shackle by positively supporting the spring and vehicle frame in a predetermined spaced relationship while the shackle parts are being worked upon, removed, replaced, etc.

Another object of my invention is to provide a jack of the foregoing character which is provided with positive clamping means for securing the same to the vehicle spring to prevent slipping and accidental displacement of the same when it is in position for use.

A further object is to provide clamp means which are self-adjustable to compensate for curved contour of the spring surface to which the structure may be attached whereby the jack structure will be supported in a substantially vertical position irrespective of curved spring contour.

Another object is to provide a jack or tool of the foregoing character which is universal in its adaptation to different forms of shackles, shackle mountings and differently shaped vehicle springs and frames. More particularly, my invention contemplates a jack having an engaging head with a plurality of differently-shaped engaging surfaces for either right or left hand engagement with either the shackle members or one or more of the shackled parts such as the frame of the vehicle, dependent upon the form of shackle or form of shackle mounting and the accessibility of the same.

Additional objects are to provide a spring jack device which is not only cheap to manufacture but is also very strong and durable; and to provide for ease and readiness in adjustment of the jack to the shackled parts, the adjustment means being self-locking in any of its adjusted positions.

Other objects and advantages will become apparent as this description progresses and by reference to the drawings, wherein:

Fig. 1 is an elevational view of one form of jack structure embodying my invention;

Fig. 2 is an elevational view, partially in section, taken substantially at right angles to the view of Fig. 1;

Fig. 3 is a plan view of one of the clamp elements;

Fig. 4 is a transverse section taken substantially on line 4—4 of Fig. 1;

Fig. 5 is a side view of the rearward portion of the rear spring and frame of a motor vehicle showing my invention applied thereto;

Fig. 6 is a section taken substantially on line 6—6 of Fig. 5;

Fig. 7 is a side view of a portion of the forward end of the front spring showing my invention applied thereto;

Fig. 8 is a side view of a portion of the rear end of the front spring and the adjacent part of the vehicle frame with my invention applied thereto;

Fig. 9 is a view similar to Fig. 8, but illustrating another form of shackle structure and another form of shackle mounting with my invention applied thereto, the jack structure being shown in different positions in full lines and dotted lines, illustrating its adaptability to different conditions.

Referring particularly to Figs. 1 to 4 of the drawings, the jack structure, which I have chosen to illustrate my invention comprises a jack sleeve member 10, the slightly enlarged bore 11 of which slidingly supports a jack stem 12. The sleeve 10 is arranged for secure clamping engagement with the vehicle spring 13 (Figs. 5, 7 and 8) and is so positively interlocked with the spring that it is not liable to slip and be displaced when in use, as will be more fully described hereinafter. To the foregoing end, the sleeve 10 is provided at its lower part with a lateral, thickened extension 14 which is provided with a threaded opening for adjustably receiving a threaded clamp stem 15. The upper end of this stem is provided with a ball 16 which cooperates with a socket in a clamp head member 17 for universal, self-adjusting movement of the head member when the spring is engaged thereby. The lower end of the stem 15 is provided with a cylindrical, knurled hand grip 18 and a nut extension 19 for adjustment of the stem 15, as will be well understood.

The upper end of the sleeve 10 is provided with a thickened lateral extension 20, substantially like and in alignment with the extension 14, and this latter extension adjustably supports a clamp shoe 21 which is adapted to engage the upper surface of the spring 13 (Figs. 5, 7 and 8) and which cooperates with the clamp head 17 to securely hold the sleeve 10 to the spring in the proper substantially vertical position for positively adjusting the shackle parts or for supporting the shackled parts (such as frame and spring) in the proper spaced relation for inspection, removal, replacement, etc. of the shackle members. More particularly, the underside of the extension 20 is undercut slightly and arcuately-shaped (Fig. 1) for cooperatively receiving and supporting the arcuately-shaped shoe 21. The mid-portion of the extension 20 dependingly supports a pin 22 which is adapted to pass through and slidingly engage in a longitudinal slot 23 in the shoe 21. The lower part of this slot 23, as at 23ª, is slightly enlarged to freely receive the head 22ª of the pin, while its other, or upper, part freely receives the stem of the pin. This construction provides for secure support of the shoe 21, but permitting of its free, arcuate self-adjusting movement lengthwise of the spring when applied to and clamped to the spring.

The jack stem 12 is provided at its outer end with an elongated engaging-head 24 which extends to one side of the stem substantially in alignment with the clamp sleeve extensions 14 and 20. This head is of an inverted V-shape in cross-section with its upper V-surface arranged to engage one of the shackled parts of the vehicle such as the frame, as clearly illustrated in Figs. 7 and 8. The foregoing attaching head surface is not suited for use in connection with certain of the shackles or certain forms of shackles (for example the rear shackle of the rear spring of Fig. 5); and to take care of these latter shackles, the lower part of the laterally extended end of the jack stem head 24 is provided with opposed, laterally-extending arms or horns 25, the outer ends of which are upturned for hook-like engagement with certain of the shackled parts (see Fig. 5).

The jack stem 12 is moved back and forth within the sleeve 10 by means of an adjusting screw 26 which threadedly engages in the slightly reduced bore 11ª in the lower end of the sleeve 10. The inner part of this stem 26 is reduced as at 26ª for free, rotatable engagment in a socket 12ª in the lower or inner end of the jack stem 12. This reduced end 26ª of the adusting stem is grooved as at 27 to receive the inner end of a pin 28 which screw-threadedly engages in the adjacent, aligned wall of the jack stem 12. This construction permits of free rotary movement of the adjusting stem 26 relative to the jack stem 12 to force the jack stem 12 outwardly or pull it inwardly, dependent upon the direction of rotation of the stem 26 by means of its handle 29. Rotation of the jack stem 12 is prevented by means of the keyway 30 in the stem and the key 31 securely fixed therein by screw 32 carried by the sleeve 10.

The clamp sleeve and jack stem may be lubricated by the application of the lubricant through the opening 33 (Fig. 2) in the side of the clamp sleeve. This opening also provides for convenient disassembly of the tool as follows: The key 31 is first removed by removal of the screw 32. The jack stem 12 is then rotated and adjusted outwardly until the head of the pin 28 is aligned with the opening 33. Any desirable form of tool, such as a screw driver, is then inserted through the opening 33 to engage the slotted end of the pin 28 to remove the same. The jack stem may then be pulled outwardly from the clamp sleeve 10.

In Figs. 5 to 9, inclusive, I have shown several modes of application of my invention. Referring particularly to Fig. 5, which illustrates the application of my invention to the rearward shackle of the rear spring, the shackle structure is of a well known form including a pair of side plates 34, 34' (Fig. 6) held in shackled engagement with shackle pins or bolts mounted in the ends of the frame 35 and spring 13, respectively, by a center bolt 36. It will be obvious from that figure that the V-surface of the jack stem head 24 would not be adapted for secure supporting engagement with the curved end of the frame 35. However, to take care of such a condition as this, the arms or horns 25, as above explained, are provided; and, in this instance, one of these arms is engaged with the shackle beneath the frame shackle bolt and this engagement is a positive one due to the hook-like upturned end of the arm. In applying the jack structure to the shackle of Fig. 5, the clamp members of the clamp sleeve are first adjusted to the spring at the proper position beneath the other shackle part to be engaged by the jack stem heat. As the clamp is adjusted to the spring, the lower clamp head 17 and the clamp shoe 21 move or rotatably adjust themselves about their supporting surfaces so that they assume the angular position indicated in Fig. 5, wherein they lie in alignment with the spring surface to securely grip the same. Thus, the curved contour of the spring is compensated for and the jack is supported in a substantially vertical position without impairing the grip of the clamp members. After the clamp members have been set in place, and the jack stem adjusted so that one of the arms 25 engages the shackle parts as indicated in Figs. 5 and 6, the adjusting stem handle 29 is rotated in a clockwise direction so as to spread apart the frame and spring and relieve the load upon the shackle leaving the shackle parts free so that a lubricant will pass freely around all of the shackled parts. In this same set-up, if it is desired to remove any of the shackled parts, the adjusting stem 26 is moved so as to properly separate or support the frame and spring and, in that case, the frame and spring are supported in predetermined position after the shackle parts have been taken away. The jack clamp arrangement which I provide insures that during this time the jack will not slip or is not likely to become accidentally displaced whereby the shackle parts may be again assembled easily and readily.

In Fig. 7 I have illustrated the application of the jack structure to the forward shackle of the front spring. In that case, it will be noted, that the upper V-surface of the jack stem head, and in some instances one arm of the same, may engage under the frame 35ᵃ and the clamp members engage the forward leaves of the spring in a manner similarly to that shown in Fig. 5. It will also be noted that in Fig. 7 the curvature of the spring is somewhat greater than that shown in Fig. 5. Regardless of this the clamp members, through their free self-adjusting action, readily receive and grip the spring, the jack structure as a whole remaining in and being maintained in a substantially vertical position.

In Fig. 8 I have illustrated the mode of application of the jack structure to the rear shackle of the front spring. In this particular form of shackle mounting, which is well known, a bracket 37 is carried by the frame 35ᵇ for support of the upper shackle parts, otherwise the shackle is of substantially the same form as that shown in Fig. 5. In this form, the underside of the channel frame 35ᵇ is engaged by the V-surface of the jack stem head while the clamp members engage the spring.

Fig. 9 illustrates still another form of mounting for the rear shackle of the front spring. The shackle illustrated in this figure is of the conventional form including the shackle bolts 38, 38' and shackle bars 39. The shackle is supported from the lower side of the frame by a bracket 40. In this instance, as in Figs. 5 to 8, inclusive, the jack clamp may be secured to the spring and the jack stem adjusted so that one of the arms 25 engage under the upper shackle part as illustrated in full lines (Fig. 9); or, if desired, it may be adjusted so that the V-surface of this head engages the underside of the frame as illustrated in dotted lines.

It is to be understood that, while I have not shown the adaptation of the jack structure to the forward shackle of the rear spring, the jack structure is equally applicable to such shackle as hereinbefore described in connection with other shackles, its manner of adjustment to such shackle being dependent upon the form of shackle and its mounting.

From the foregoing it will be obvious that I have provided an efficient jack structure which is adapted for holding the spring and frame at a correct distance while the shackle parts such as bolts, bushings, etc. are being inspected, repaired, replaced, etc.; and for relieving the load on the shackle parts (bolts, bushings, etc.) for the proper lubrication of the same. The universal jack head structure provides for use of the jack structure with all forms of shackles. The oppositely disposed jack head arms 25 provide for right hand as well as left hand set-ups and adjustments. The clamp non-slippingly engages the spring and the parts are positively held in jacked position while being worked upon.

While I have shown only one form of my invention (in its application to different shackle structures) it is to be understood that other changes in details and arrangement of parts may be made without departing from the spirit and scope of my invention as defined by the claims which follow.

I claim:

1. In a device of the character described, a sleeve member adapted for direct attachment to the vehicle spring, and a jack-stem-unit screw-threadedly passing through said sleeve, said unit including at one end a head member having a plurality of engaging surfaces for engagement of said head with the frame of the vehicle or the shackle members.

2. In a device of the character described, a sleeve member, clamp means carried by and adjustable relative to said sleeve for securely clamping the latter to the vehicle spring, and a jack-stem-unit screw-threadedly passing through both ends of said sleeve, said unit including at one end of a rigidly-connected head member aligned with said clamp means and having a plurality of engaging surfaces for selective, positive, non-slip engagement of said head with the frame of the vehicle or the shackle members.

3. In a device of the character described, a sleeve member, clamp elements mounted along the side wall of said sleeve leaving the ends of said sleeve free for securing the same to the vehicle spring, and a stem member passing axially through and adjustably carried by said sleeve and having a rigidly-connected head for engagement with either the shackle or the vehicle frame.

4. In a device of the character described, a sleeve member, self-adjusting clamp elements carried by and laterally of said sleeve leaving the sleeve ends unobstructed for securing the same to the vehicle spring in a substantially vertical position irrespective of whether the spring surface engaged is curved or straight, and a stem member adjustably passing through said sleeve and having a rigidly-connected head projecting laterally therefrom in alignment with said clamp elements and adapted for engagement with either the shackle or the vehicle frame.

5. In a device of the character described, a sleeve member having lateral extensions, each said extension supporting a clamp element which is adapted to embrace the vehicle spring and each of which when clamped to the spring being self-adjustable to clamp the spring squarely irrespective of curved contour of the spring while leaving the sleeve in a substantially vertical position, a jack member carried by said sleeve, means for adjusting said jack member, and a head on said jack member provided with a plurality of gripping surfaces for engagement with either the shackle or the vehicle frame.

6. In a device of the character described, a sleeve member, a clamp screw carried by said member, a self-adjustable head on said screw, a clamp shoe carried by said sleeve in spaced, aligned relation to said clamp screw head, said shoe being self-adjustable, and an adjustable stem carried by said sleeve which stem is engageable with one of the shackled parts of a vehicle for adjusting and supporting the same.

7. In a device of the character described, a sleeve member, means for securing said sleeve to the vehicle spring which comprises a pair of aligned lateral extensions on said sleeve, a clamp screw carried by one of said extensions, a self-adjustable head on said screw, a clamp shoe carried by the other of said extensions in spaced aligned relation to said clamp screw head, said shoe being self-adjustable, and an adjustable stem carried by said sleeve which stem is engageable with one of the shackled parts of a vehicle for adjusting and supporting the same.

8. In a device of the character described, a sleeve member having spaced lateral extensions, a clamp element adjustably carried by one of said extensions and having a universally movable head engageable with the vehicle spring, a second clamp element supported by the other of said extensions by a slot-and-pin connection, the engaging surfaces of said extension and second element being similarly curved for adjustment of said second element to curved surfaces while leaving said sleeve in substantially vertical position, and a jack member engageable with the vehicle frame or shackle, said latter member being adjustably supported by said sleeve.

9. In a tool for adjusting and supporting the shackled parts of a vehicle, a sleeve, non-slip clamp means for securing said sleeve to the vehicle spring which included a clamp screw carried by said sleeve, a head on said screw engageable with one side of the spring and rockable in all directions, and a clamp element carried by said sleeve engageable with the other side of the spring and rockable in the direction of the length of the spring, a jack member adjustably supported by said sleeve and adapted for lifting engagement with the vehicle frame or the shackle, and means for adjusting said member.

10. In a tool for adjusting and supporting the shackled parts of a vehicle, a sleeve, non-slip clamp means for securing said sleeve to the vehicle spring which includes a clamp screw carried by said sleeve, a head on said screw engageable with one side of the spring and self-adjustable in all directions so as to seat flat against curved contour of the spring, and a clamp shoe carried by said sleeve engageable with the other side of the spring and self-adjustable in the direction of the length of the spring so as to seat flat against curved contour of the spring, a jack member adjustably supported by said sleeve and adapted for lifting engagement with the vehicle frame or the shackle, and means for adjusting said member.

11. In a tool for adjusting and supporting the shackled parts of a vehicle, a sleeve, non-slip clamp means for securing said sleeve to the vehicle spring which includes aligned, spaced lateral extensions on said sleeve, a clamp screw threadedly engaged with one of said extensions, and adjustable engagement-head on said screw engageable with one side of the spring, an arcuate-shaped clamp shoe supported by the other of said extensions by a slot-and-pin connection, the surface of said extension engaged by said shoe being curved similarly to said shoe, a jack member adjustably supported by said sleeve and adapted for lifting engagement with the vehicle frame or the shackle, and means for adjusting said member.

12. In a jack tool for supporting and adjusting the shackled parts of a vehicle, a sleeve, means for securing said sleeve to the vehicle spring with said sleeve in an upright position, a member adjustable back and forth in said sleeve, and an inverted V-shaped head on said member, said head extending in one direction adapted for engagement with the vehicle frame, and opposed arms on said head extending at substantially right angles to said head adapted for engagement with the shackle.

13. In a jack tool for supporting and adjusting the shackled parts of a vehicle, a member adapted for attachment to one of the shackled parts, a jack element passing through and adjustably supported by said member, said element having at one end an elongated head projecting laterally therefrom and adapted for engagement with the other of the shackled parts, and arms projecting laterally from said element and extending at an angle from said head and upturned at their ends to hook into the shackle structure.

14. In a jack tool for supporting and adjusting the shackled parts of a vehicle, a member adapted for attachment in a substantially vertical position to the vehicle spring, means for clamping said member to the spring, a jack element adjustably supported by said member, said element having an elongated head extending laterally of said member and element and adapted for engagement with the underside of the vehicle frame, and arms extending at an angle from said head and upturned at their ends to hook into the shackle structure.

15. In a device of the character described, a sleeve member, means for attaching said sleeve to the vehicle spring, a jack element adjustably supported by said sleeve, means for adjusting said element, and a head on said element which is of inverted V-shape with its narrow V-edge surface engageable throughout its length with the vehicle frame, and angularly extending, hook-shaped arms extending from the lower part of said head at one end thereof for engagement with the shackle.

16. In a device of the character described, a sleeve member having vertically-spaced, lateral extensions, clamp elements carried by said extensions for securing said sleeve to the vehicle spring, a jack member adjustably carried by said sleeve, means for adjusting said jack member, and an elongated head on said jack member extending laterally of said jack member in vertical alignment with said extensions, said head having its upper surface adapted for engagement with the vehicle frame, and arms having upturned ends extending from the lower part of said head at substantially right angles thereto and at one end thereof.

17. In a device of the character described, a sleeve, a jack member slidably mounted in said sleeve, an adjusting screw having threaded engagement with said sleeve, said jack member having a bore in its inner end and said screw having its inner end reduced to fit into said bore, said screw-reduced-end having a circumferential groove, a screw pin carried by said jack member and having its end passing into said screw groove to fasten said screw and jack member together, key and key-way means for normally preventing rotation of said jack member, said sleeve having an opening diametrically opposite that part of said jack member supporting said screw pin, said key being removable to permit rotation of said jack member for alignment of said screw pin with said sleeve opening for removal of said pin for disassembly of the tool.

In testimony whereof, I have subscribed my name,

HERMAN W. ZIMMERMAN.